US007171687B2

(12) United States Patent
Uemura

(10) Patent No.: US 7,171,687 B2
(45) Date of Patent: Jan. 30, 2007

(54) CONTENTS DISTRIBUTION APPARATUS

(75) Inventor: Tetsuya Uemura, Sayama (JP)

(73) Assignee: Hitachi, Ltd., Tokyo (JP)

( * ) Notice: Subject to any disclaimer, the term of this patent is extended or adjusted under 35 U.S.C. 154(b) by 582 days.

(21) Appl. No.: 09/942,606

(22) Filed: Aug. 31, 2001

(65) Prior Publication Data

US 2002/0118835 A1    Aug. 29, 2002

(30) Foreign Application Priority Data

Feb. 28, 2001  (JP)  ............... 2001-053736

(51) Int. Cl.
  G06F 7/04   (2006.01)
  G06F 7/58   (2006.01)
  G06F 12/00  (2006.01)
  G06F 12/14  (2006.01)
  G06F 13/00  (2006.01)
  G06F 15/16  (2006.01)

(52) U.S. Cl. ........................................ 726/18; 709/229

(58) Field of Classification Search ................ 380/231; 705/26, 57, 14, 51–52; 718/105; 725/46; 713/202; 370/229; 709/203, 226, 228–229; 707/203; 726/18
See application file for complete search history.

(56) References Cited

U.S. PATENT DOCUMENTS

| | | | | |
|---|---|---|---|---|
| 5,710,887 A * | 1/1998 | Chelliah et al. | ............... | 705/26 |
| 5,920,701 A * | 7/1999 | Miller et al. | ................. | 709/228 |
| 6,009,410 A * | 12/1999 | LeMole et al. | ................ | 705/14 |
| 6,088,805 A * | 7/2000 | Davis et al. | ................. | 713/202 |
| 6,115,718 A * | 9/2000 | Huberman et al. | ......... | 707/102 |
| 6,182,133 B1 * | 1/2001 | Horvitz | ....................... | 709/223 |
| 6,199,113 B1 * | 3/2001 | Alegre et al. | ............... | 709/229 |
| 6,253,193 B1 * | 6/2001 | Ginter et al. | ................. | 705/57 |
| 6,463,454 B1 * | 10/2002 | Lumelsky et al. | .......... | 718/105 |
| 6,622,168 B1 * | 9/2003 | Datta | ......................... | 709/219 |
| 6,757,710 B2 * | 6/2004 | Reed | .......................... | 709/203 |
| 6,832,240 B1 * | 12/2004 | Dutta | ......................... | 709/203 |
| 2001/0034709 A1 * | 10/2001 | Stoifo et al. | .................. | 705/51 |
| 2001/0037407 A1 * | 11/2001 | Dragulev et al. | ........... | 709/250 |
| 2001/0054029 A1 * | 12/2001 | Williams | ..................... | 705/52 |
| 2002/0002688 A1 * | 1/2002 | Gregg et al. | ................. | 713/202 |
| 2002/0021665 A1 * | 2/2002 | Bhagavath et al. | ......... | 370/229 |

(Continued)

FOREIGN PATENT DOCUMENTS

JP      09214935      8/1997

(Continued)

Primary Examiner—Christopher Revak
Assistant Examiner—Arezoo Sherkat
(74) Attorney, Agent, or Firm—Mattingly, Stanger, Malur & Brundidge, P.C.

(57) ABSTRACT

To acquire contents prior to a distribution request from a client in a time zone having sufficient network bandwidth, and efficiently use network bandwidth. An access trends analysis handler analyzes access to contents by a client, a contents prediction handler predicts contents expected to be in demand in the future based on this analysis result, and a contents acquisition handler acquires the forecast contents in a time zone when there is sufficient network bandwidth. A contents deletion handler predicts contents in the acquired contents for which not much demand is expected from the client contents access trends, and deletes these contents. Due to this invention, a contents distribution apparatus can be provided which enables efficient use of network bandwidth and disk capacity.

16 Claims, 7 Drawing Sheets

U.S. PATENT DOCUMENTS

| | | | |
|---|---|---|---|
| 2002/0029384 A1* | 3/2002 | Griggs | 725/46 |
| 2002/0062481 A1* | 5/2002 | Slaney et al. | 725/42 |
| 2002/0083178 A1* | 6/2002 | Brothers | 709/226 |
| 2002/0169974 A1* | 11/2002 | McKune | 713/200 |
| 2004/0210604 A1* | 10/2004 | Li et al. | 707/104.1 |

FOREIGN PATENT DOCUMENTS

| | | |
|---|---|---|
| JP | 10013811 | 1/1998 |
| JP | 11-007407 | 1/1999 |
| JP | 11252486 | 9/1999 |
| JP | 2000-013779 | 1/2000 |
| JP | 2000 235539 | 8/2000 |
| JP | 2000 276425 | 10/2000 |
| JP | 2000 341670 | 12/2000 |

\* cited by examiner

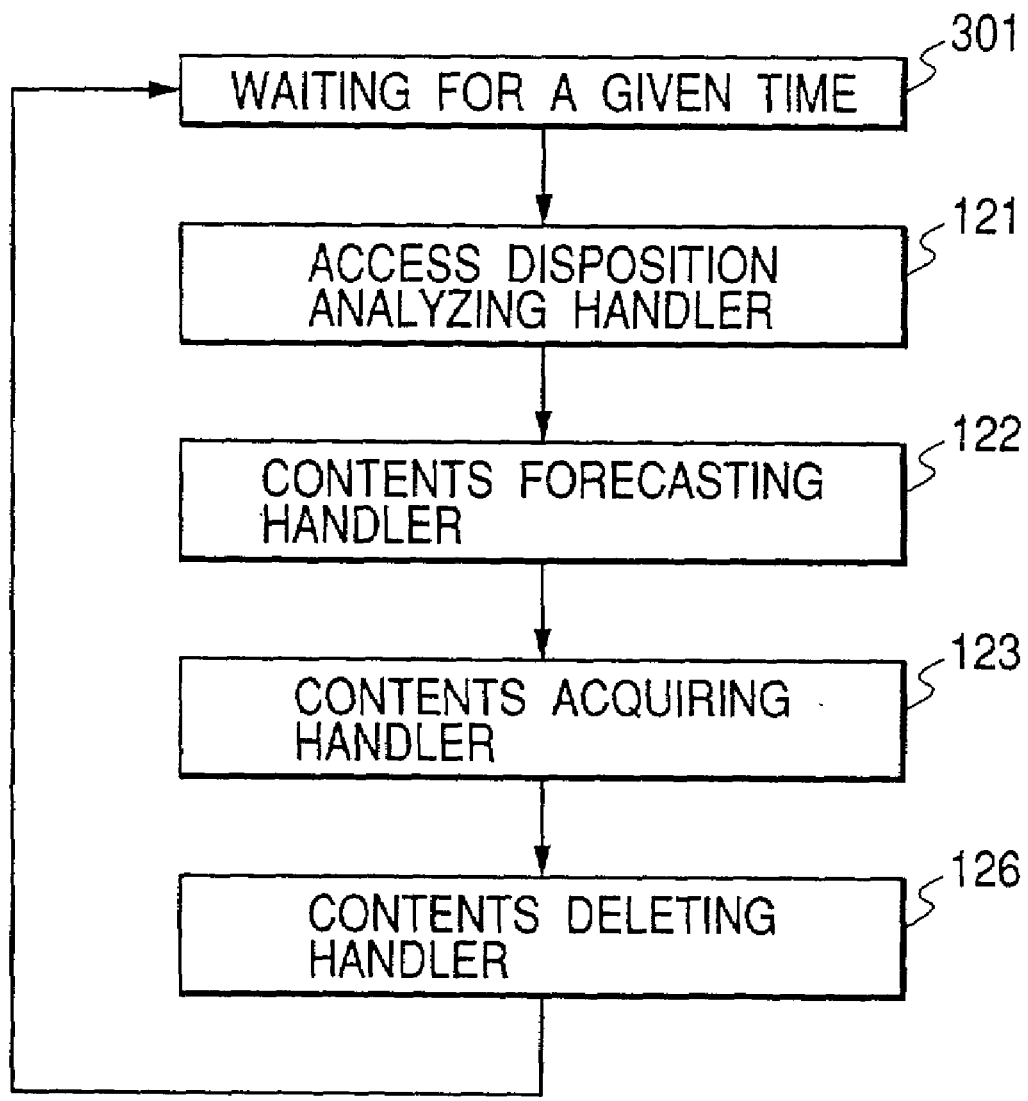

| CONTENT NAME (411) | GENRE NAME (412) | PRODUCER NAME (413) | STATE FLAG (414) | LAST DISTRIBUTION TIME (415) |
|---|---|---|---|---|
| CONTENT 1 | GENRE 1 | PRODUCER 1 | ALREADY ACQUIRED | TIME 1 |
| CONTENT 2 | GENRE 2 | PRODUCER 2 | NOT ACQUIRED | |
| CONTENT 3 | GENRE 3 | PRODUCER 3 | INDICATING ACQUIREMENT | |
| ⋮ | ⋮ | ⋮ | ⋮ | ⋮ |

420

| CONTENT NAME (411) | DISTRIBUTION NUMBER (421) |
|---|---|
| CONTENT 1 | N1 |
| CONTENT 2 | N2 |
| CONTENT 3 | N3 |
| ⋮ | ⋮ |

430

| GENRE NAME (412) | DISTRIBUTION NUMBER (431) |
|---|---|
| GENRE 1 | M1 |
| GENRE 2 | M2 |
| GENRE 3 | M3 |
| ⋮ | ⋮ |

440

| PRODUCER NAME (413) | DISTRIBUTION NUMBER (441) |
|---|---|
| PRODUCER 1 | L1 |
| PRODUCER 2 | L2 |
| PRODUCER 3 | L3 |
| ⋮ | ⋮ |

450

| CLIENT NAME (451) | CONTENT NAME (411) | DISTRIBUTION PERMISSION (452) |
|---|---|---|
| CLIENT 1 | CONTENT 1 | YES |
| CLIENT 1 | CONTENT 2 | NO |
| CLIENT 2 | CONTENT 1 | NO |
| CLIENT 2 | CONTENT 2 | YES |
| ⋮ | ⋮ | ⋮ |

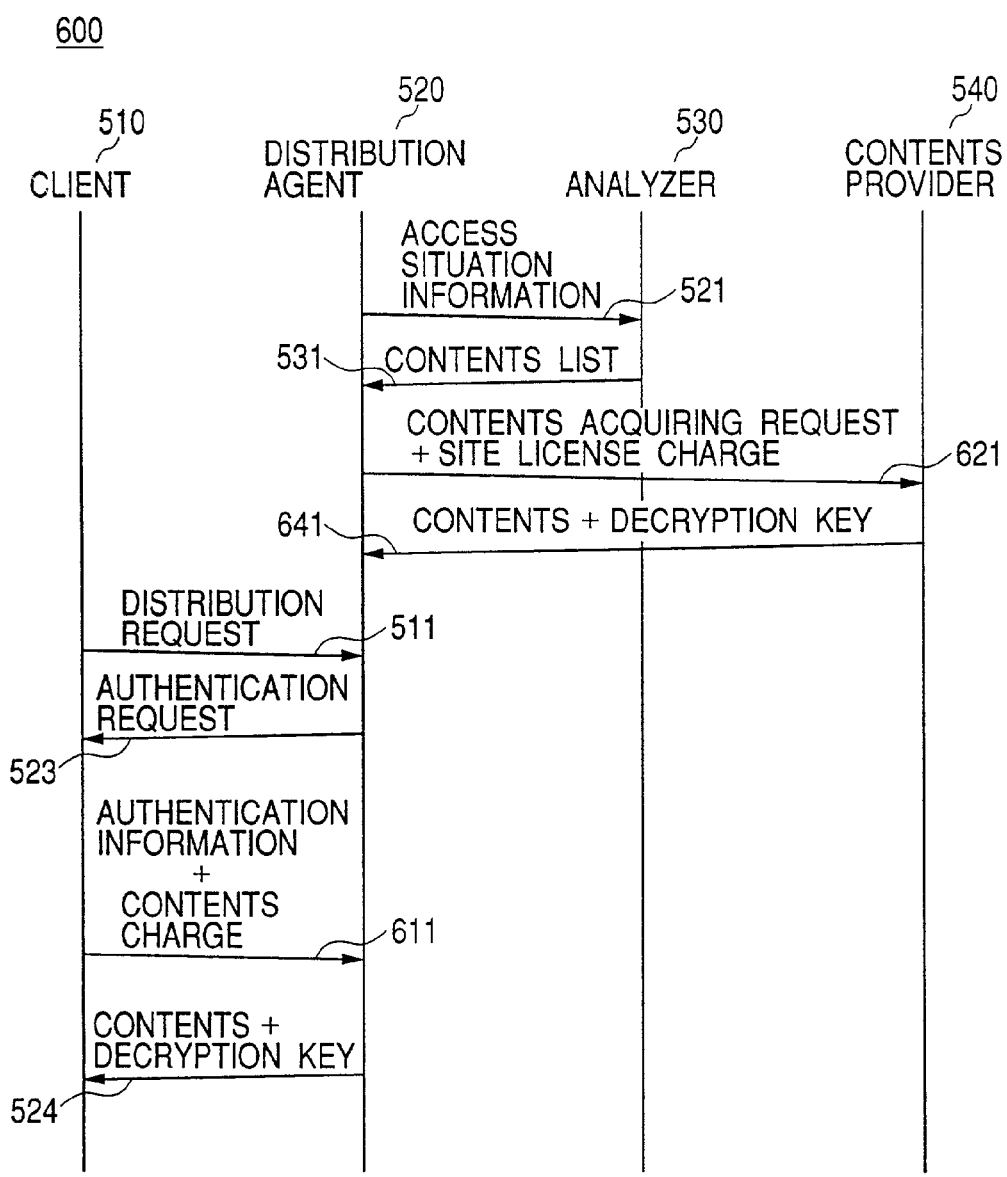

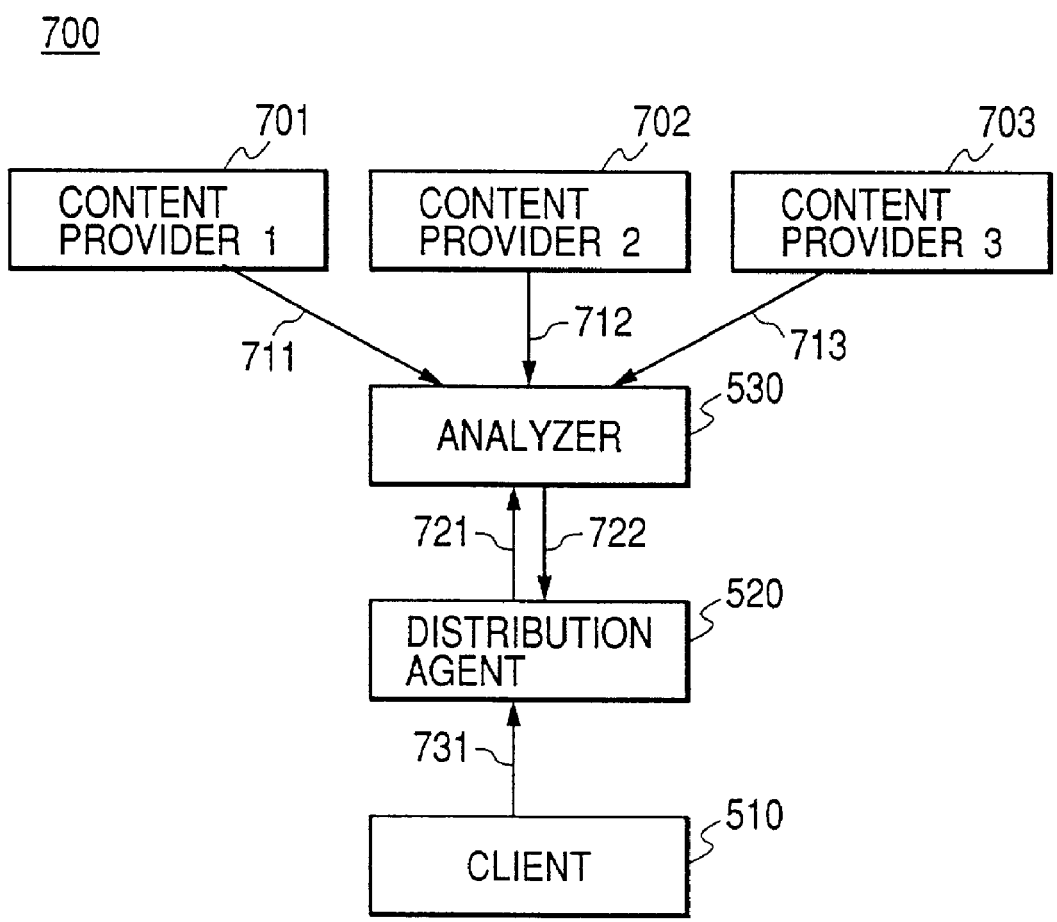

CONTENTS DISTRIBUTION APPARATUS

BACKGROUND OF THE INVENTION

1. Field of the Invention

This invention relates to a contents distribution apparatus which distributes contents such as information. In particular, this invention relates to a contents distribution apparatus which can predict contents expected to generate future demand based on past access situation information for the contents and previously acquire the contents, still relates to a contents distribution method using this apparatus, and relates to a contents providing method for providing the contents to a client, and to a method of introducing a contents provider to an Internet Service Provider (ISP).

2. Description of Related Art

With the rapidly increasing popularity of the World Wide Web (WWW), traffic amount on the Internet is increasing rapidly. The traffic amount is increasing even more due to the spread of music and motion pictures such as MP3 and MPEG.

Consequently, network bandwidth is under pressure, and in the case of clients connected by a network of small bandwidth, there is a considerable delay from when a request to transfer certain contents is sent until the contents are actually received.

In order to solve this problem, there is a technique of caching contents from a master server on which the original contents were saved, on a proxy server of a local network.

For example, in the WWW, this cache mechanism can be realized by using the Hypertext Transfer Protocol (HTTP) described in RFC2068.

If a cache error occurs when a contents access request is sent to a proxy server from a client, the proxy server will acquire the contents from the master server by pull on demand.

If the contents are transferred via a global network, the client may be kept waiting for a long time.

However, if the contents are cached on the proxy server, as they are transferred only within the local network, the client waiting time can be reduced. Proxy servers can also be connected via a layer hierarchy.

For example, in large companies, there is a proxy server for every section, and the proxy server uppermost in the organization may be connected with the proxy server of each office, and the proxy server of each department, via a layered hierarchy. When there is such a proxy layer, it is possible to query the "brothers" or "neighbors" of a certain proxy server as to the existence of contents by using Internet Cache Protocol (ICP) described in RFC2186.

As for deletion of contents cached on the proxy server, for example in the case of SQUID Internet Object Cache which can be obtained from http://squid.nlanr.net/Squid/, contents may be deleted by using a Least Recently Used (LRU) algorithm.

Furthermore, in the streaming distribution of music or motion pictures, when the network bandwidth becomes smaller than the bandwidth required by the contents, the play back of the contents may be interrupted.

In order to solve this problem, there is a technique of distributing the contents by varying the bit rate of the contents according to the network bandwidth, as in the "Data Distribution Method and Proxy Internet Server" disclosed in Laid open patent JP-A NO. 2000-13779.

In a proxy with the usual layered hierarchy, a technique of acquiring contents by pull from a high order proxy is used when a cache error occurs in a client request.

On the other hand, in "the dynamic push filtering method accompanied by staging/buffering in the proxy layer" disclosed in Laid open patent JP-A No. Hei.11-7407, push distribution of contents is realized within the proxy layer using the contents access (usage) situation information.

However, in the proxy (cache) server according to the prior art, the contents access situation information is merely transmitted to the high order cache server within the proxy layer, and control is not performed to acquire contents from the master server before there is a request from the client using the access situation information. For this reason, acquisition of contents is performed for the first time when there is an access request from the client, thereby the contents cannot be distributed in a time zone when there is sufficient network bandwidth.

Moreover, although push distribution of contents can be performed in the proxy layer, acquisition of contents by the uppermost cache server from the master server which stored the original contents, is a pull acquisition when there is an access request from the client. If the streaming distribution of music or motion picture is performed at this time when there is insufficient global network bandwidth, play back by the client may be interrupted, or the client may get low bit rate, poor quality sound and image.

Furthermore, as contents expected to be needed in the near future from the access situation information will be deleted when the Least Recently Used algorithm is used for deletion of cached contents, the contents must re-acquired and this increases the pressure on the network bandwidth.

When caching fee-based contents in a cache server, it is necessary to perform control to distribute contents only to a client which has paid the contents fee, and not distribute the contents to a client which has not paid the contents fee, but such control cannot be performed in a conventional cache server.

When an Internet service provider (ISP) makes a start of a contents distribution agent operation, a large amount of work is involved in investigating which contents provider is suitable, investigating from which contents provider it is appropriate to receive the contents, and in procedures relating to contents usage with contents providers.

SUMMARY OF THE INVENTION

It is therefore a first object of this invention to provide a contents distribution apparatus and distribution method which predict contents expected to be in demand in the future based on the access situation information of the contents and acquire them.

It is a second object of this invention to provide a contents distribution apparatus which determines the deletion timing of the acquired contents based on the access situation information of the contents.

It is a third object of this invention to provide a contents distribution method which distributes fee-based contents between a contents provider, a contents distribution agent and a client.

It is a fourth object of this invention to provide a contents distribution method which distributes contents between plural contents providers, an analyzer, a distribution agent and a client.

This invention therefore provides an apparatus which collects contents access situation information from a client, and a contents distribution apparatus which has a means to analyze the access trends of contents based on the collected access situation information.

Further, it has a means to predict the contents expected to be in demand in the future, based on the analyzed access trends.

Further, it comprises an apparatus which acquires the contents which were predicted to be in demand in the future.

This invention also provides a contents distribution method comprising a step which collects contents access situation information from a client, a step which analyzes the contents access trends based on the collected access situation information, a step which transmits the analyzed access trends to a server which predicts the contents expected to be in demand in the future based on the analyzed access trends and send a list of the contents, and a step which receives the list of the contents from the server, and a step which acquires the contents based on the received list of the contents.

By providing this apparatus and method, contents are acquired in a time zone when there is not much access from clients, and which has sufficient network bandwidth, so effective use of network bandwidth is attained.

Further, this invention provides a method comprising a step which collects contents access situation information from a client in an ISP (Internet Service Provider), a step which analyzes contents access trends based on the collected access situation information, a step which predicts contents expected to be in demand in the future based on the analyzed access trends, a step which searches a contents service provider from a list of contents providers which have contents in a certain category which is same to the predicted contents' one, and a step which introduces the contents provider to the ISP.

By providing this method, a distribution agent can be made aware that even if a contents provider does not yet have any transaction experience, it possesses contents which match client access trends without performing any special procedures.

Further, this invention provides a method comprising a step which analyzes contents access trends, and transmits access situation information to an analyzing agent which predicts contents expected to be in demand in the future, a step which receives a list of the contents expected to be in demand in the future from the analyzing agent, a step which transmits a contents acquisition request to a contents provider based on this contents list, a step which acquires the contents from the contents provider, and a step which distributes the contents to a client based on a distribution request from the client.

By providing this method, a distribution agent can receive the contents list expected to be in demand in the future based on the analysis result from the analyzing agent, acquire the contents from the contents provider based on this contents list, and distribute the contents to the client.

Other and further objects, features and advantages of the invention will appear more fully from the following description.

BRIEF DESCRIPTION OF THE DRAWINGS

Embodiments of the present invention are described below in conjunction with the figures, in which:

FIG. 3 is a diagram showing the flow for input process logic performed at a fixed interval in the first embodiment of the contents distribution apparatus according to this invention;

FIG. 4 is a diagram showing databases used in the first embodiment of the contents distribution apparatus according to this invention;

FIG. 6 is a diagram showing a time chart in a third embodiment of the contents distribution method according to this invention; and FIG. 7 is a diagram showing blocks in a fourth embodiment of the contents distribution method according to this invention.

DETAILED DESCRIPTION OF THE PREFERRED EMBODIMENTS

Figure 1:
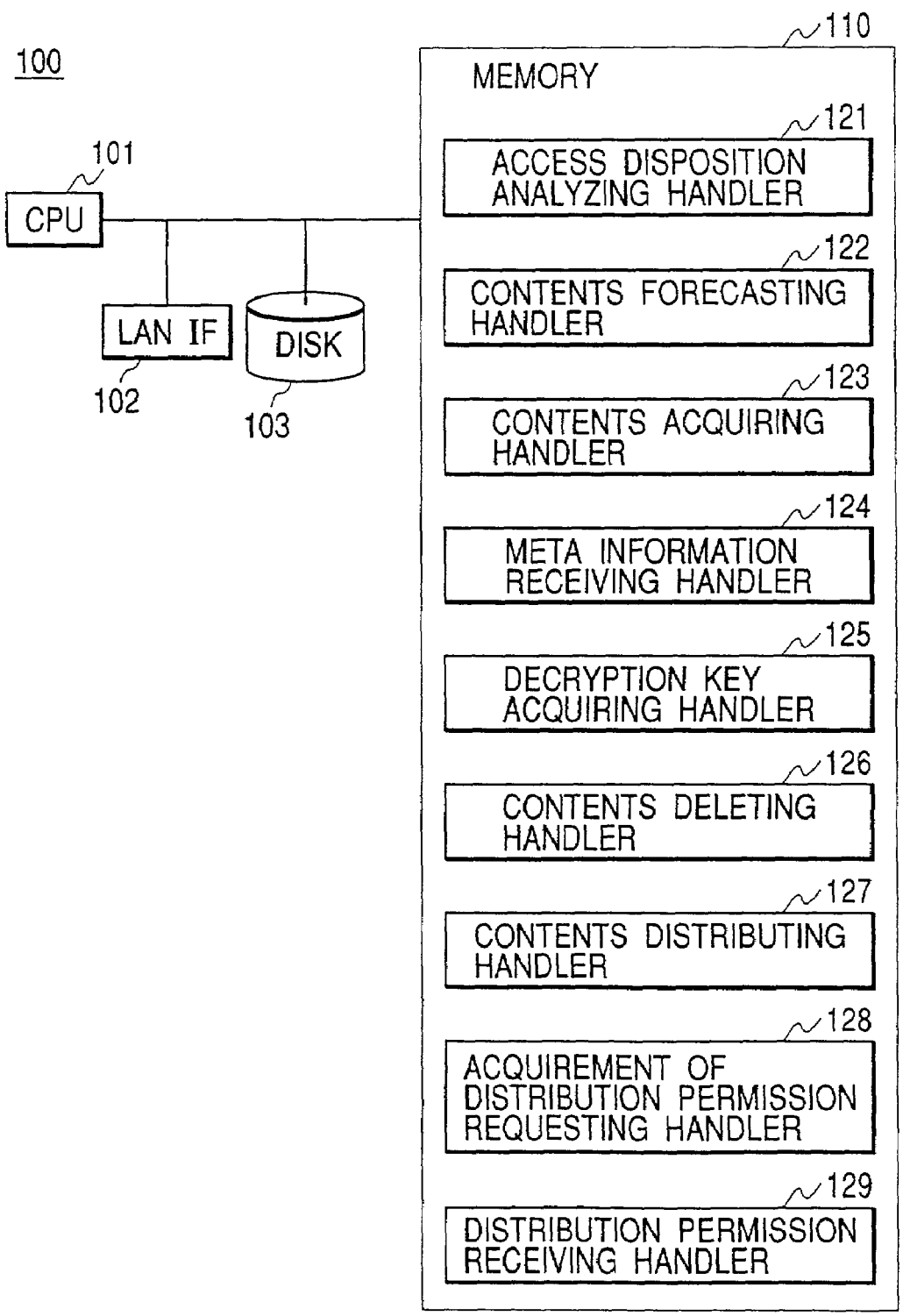
FIG. 1 is a diagram showing the architecture of a first embodiment of a contents distribution apparatus according to this invention.

The embodiments of this invention will now be described referring to the drawings. The same reference numbers show the same component elements.

FIG. 1 is a block diagram for the architecture of a first embodiment of the contents distribution apparatus according to this invention. In FIG. 1, 100 is the architecture of the first embodiment of the contents distribution apparatus according to this invention, 101 is a operation unit, 102 is a LAN connection interface, 103 is a disk apparatus, 110 is a memory, 121 is an access trends analyzing handler, 122 is a contents predicting handler, 123 is a contents acquiring handler, 124 is meta-information receiving handler, 125 is a decryption key acquiring handler, 126 is a contents deleting handler, 127 is a contents distributing handler, 128 is an acquirement of distribution permission requesting handler and 129 is a distribution permission receiving handler.

Figure 2:
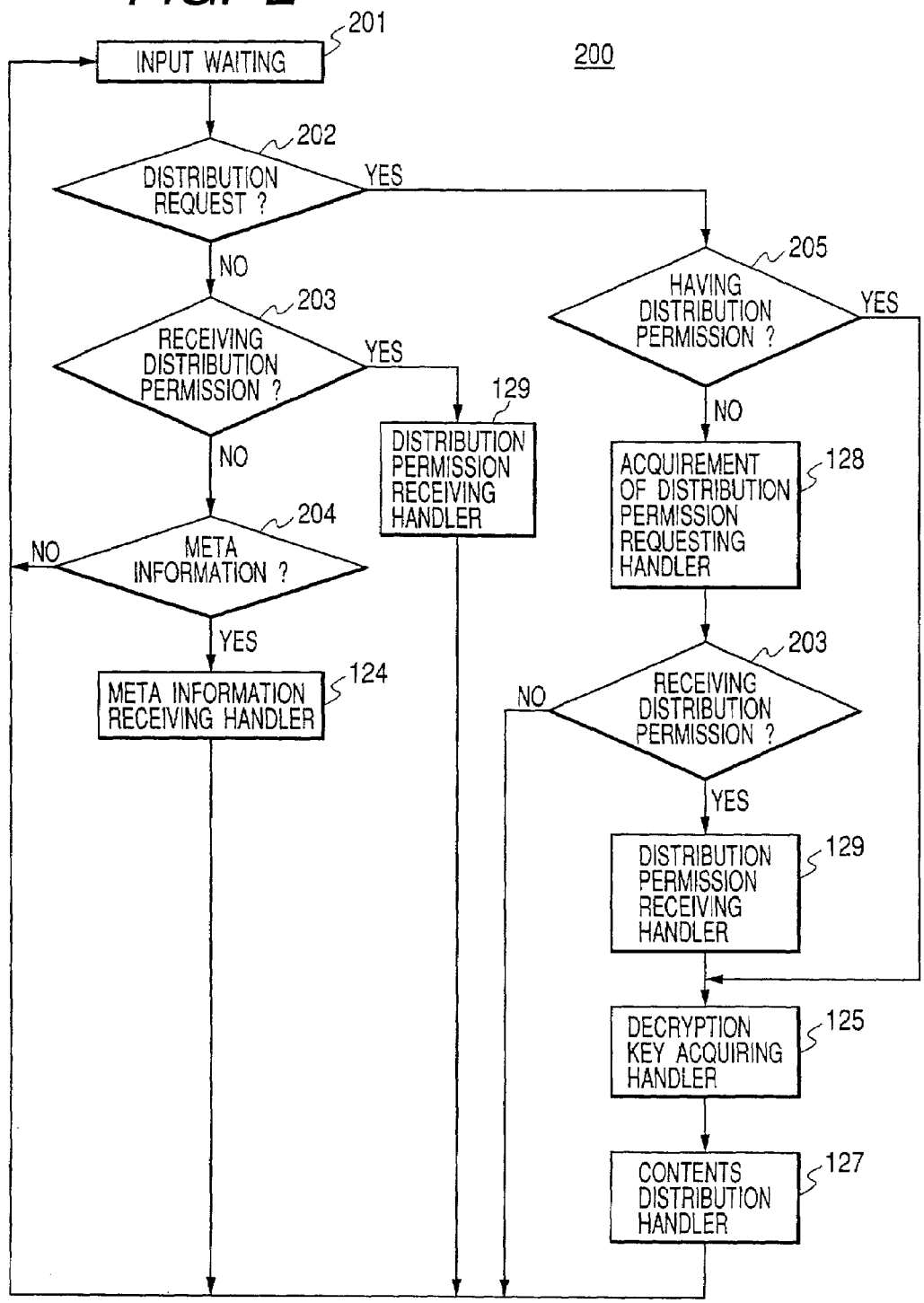
FIG. 2 is a diagram showing the flow for input process logic of a LAN connection interface of the first embodiment for the contents distribution apparatus according to this invention.

FIG. 2 is a flowchart of the input process logic of the LAN connection interface of the first embodiment of the contents distribution apparatus according to this invention.

In FIG. 2, 200 is a flowchart of input process logic of a LAN connection interface according to the first embodiment of the contents distribution apparatus according to this invention, 201 is an input waiting process, 202 is a determination of whether or not a contents distribution was requested by the client, 203 is a determination of whether a distribution permission was received from a server, 204 is a determination of whether meta-information was received from the server, and 205 is a determination of whether the distribution permission has been assigned to the client.

FIG. 3 is a flowchart of the process logic performed at a fixed interval in the first embodiment of the contents distribution apparatus according to this invention. In FIG. 3, 300 is a process logic flowchart performed at a fixed interval in the first embodiment of the contents distribution apparatus according to this invention, and 301 is a waiting process which waits for a given time and which is periodically started or updated by scheduling or the like.

FIG. 4 is a database used in the first embodiment of the contents distribution apparatus according to this invention. In FIG. 4, 410 is a contents information database, 411 is a contents name entry, 412 is a genre name entry, 413 is a producer name entry, 414 is a contents acquisition state flag entry, 415 is a last distribution time entry, 420 is a contents access number database, 421 is a number of distributions entry for contents, 430 is a genre access number database, 431 is a number of distributions entry for genres, 440 is a producer access number database, 441 is a number of distributions entry for producer name, 450 is a client contents distribution permission database, 451 is a client name entry and 452 is a contents distribution permission entry.

According to this embodiment, the contents are acquired in a time zone when there is sufficient network bandwidth, prior to an access request from the client by the access trends analyzing handler 121, contents predicting handler 122 and contents acquiring handler 123 shown in FIG. 1, and distributes the contents only when contents distribution to the client has been permitted by the determination 205 of whether distribution permission has been given to the client in FIG. 2.

First, the input operation to the LAN connection interface 102 in FIG. 1 will be described. The contents distribution apparatus 100 is connected to the client and server on the network via the LAN connection interface 102. In the initial state, the input waiting process 201 is performed which waits for a connection from the client or server as shown in FIG. 2. At this time, when a contents distribution request is received from the client, the routine proceeds from the input waiting process 201 via the determination 202 of whether the distribution request was received from the client, to the determination 205 of whether contents distribution to the client is permitted.

The determination 205 of whether contents distribution to the client was permitted refers to the client contents distribution permission database 450 shown in FIG. 4. In the example of the database 450, distribution of contents 1 to a client 1 is permitted, but distribution of contents 2 to a client 1 is not permitted, whereas distribution of the contents 1 and 2 to a client 2 is not permitted. As a result of this determination, when distribution is permitted, processing is performed by the handler 125 which acquires the decryption key for the decrypted contents as shown in FIG. 2, and when distribution is not permitted, processing is performed by the acquirement of distribution permission requesting handler 128.

In the acquirement of distribution permission requesting handler 128, a request is issued for the client which issued the distribution request to acquire distribution permission from the server which manages the contents distribution permission information. Due to this request, when the client acquires the distribution permission, the server which manages distribution permission information transmits the distribution permission information to the contents distribution apparatus according to this embodiment. This distribution permission information comprises at least a name to distinguish the client, and a name to distinguish the contents. After termination of the handler 128, the routine proceeds to the determination 203 of whether the distribution permission was received.

In the determination 203 of whether distribution permission was received, when the distribution permission information was received, the routine proceeds to the distribution permission receiving handler 129, and when the distribution permission information was not received, the routine returns to the input waiting process 201. In the distribution permission receiving handler 129, the corresponding contents distribution permission entry in the database 450 of FIG. 4 is updated from No to Yes depending on the received information. After termination of the handler 129, the routine proceeds to the decryption key acquiring handler 125.

In the decryption key acquiring handler 125, the contents decryption key corresponding to a set of a client and contents is acquired from the server which manages decryption keys. This decryption key may be generated by the following steps, for example, encrypting the contents with common key encryption (method wherein the same key is used for encryption and decryption), and further encrypting the key used at this time by public key encryption (generating a public key for encryption and a private key for decryption as a pair of keys, and decrypting data encrypted by the public key, with the private key). Here, "public key encryption" means that a different key is used for encryption and decryption, the "private key" being a key for decrypting the encrypted data. After termination of the handler 125, the routine proceeds to the contents distributing handler 127.

In the contents distributing handler 127, a pair comprising the contents decryption key and the encrypted contents acquired by the handler 125 are distributed to the client, and the following database updating process is performed. The distribution time is written to the last distribution time entry column 415 corresponding to the contents in the database 410 shown in FIG. 4. The genre name entry 412 and producer name entry 413 corresponding to the contents from the database 410 are read, and the values of the distribution number entries 421, 431, 441 corresponding to the databases 420, 430, 440 are incremented by 1. If the value of the state flag 414 corresponding to the contents in the database 410 has been "not yet acquired", the contents are acquired from the server which manages the contents, and the contents are stored in the disk apparatus 103. The value of the state flag 414 is then updated to "acquired", and the contents are distributed to the client. After the above processing has terminated, the routine returns to the input waiting process 201.

In this way, by determining whether the client has acquired the contents distribution permission, even for contents already stored in the disk apparatus, control can be performed to distribute the contents only when this is specified separately by the server. This technique is particularly useful when for example control is performed to distribute fee-based contents only to a client who has paid the contents fee.

When the input waiting process 201 is performed, and the distribution permission information is received, the routine proceeds via the determinations 202, 203 to the distribution permission receiving handler 129 of FIG. 1, and the routine returns to the input waiting process 201.

When the input waiting process 201 is performed, and contents meta-information (i.e., additional information required to classify the contents) including the contents, genre and producer name and so forth has been received, the routine proceeds via the determinations 202, 203, 204 to the meta-information receiving handler 124 of FIG. 1.

In the handler 124, the following database updating process is performed. First, new data is added to the database 410 in FIG. 4. Here, received values are used respectively corresponding to the contents name entry 411, genre name entry 412 and producer name entry 413, the state flag is "not yet acquired" and the last distribution time is left blank. Next, the received contents are used as the contents in the database 420, and new data is added having a distribution number of 0.

Further, the genre name is searched in the database 430, and when the received genre is not registered, the received genre name is used as the genre name and new data is added having the distribution number 0. Identical processing is performed for the database 440. After the above processing has terminated, the routine returns to the input waiting process 201.

Here, the meta-information was only the contents name, genre name and producer name, but identical processing may be performed also for other information.

Next, the processing performed at a fixed interval will be described using the flowchart shown in FIG. 3. In the initial state, the waiting process 301 which waits for a fixed time is performed. After the fixed time has elapsed, the routine proceeds to the access trends analyzing handler 121.

In the access trends analyzing handler 121, the following processing is performed. For the contents name registered in the database 410 of FIG. 4, the values of the genre name entry 412 and producer name entry 413 are read, and the corresponding values for the number of distributions Ng for genre name and number of distributions Np for producer are read from the number of distribution entries 431, 441 in the databases 430, 440. An acquisition weight represented by $a*Ng+b*Np$ is then calculated for each contents, and a list wherein each entry comprises the contents and acquisition weight is prepared. Here, a and b are suitable parameters for management information for the contents distribution apparatus according to this embodiment. After the above processing has terminated, the routine proceeds to the contents forecasting handler 122.

In the contents predicting handler 122, the following processing is performed. The list of contents and acquisition weights prepared by the handler 121 is sorted by the acquisition weight as a key. For nr contents starting from the largest acquisition weight in the sorted list, the acquisition state flag entry 414 of the contents database 410 is examined, and if the value is "not yet acquired", it is updated to an "acquire". Here, nr is a suitable parameter for management information for the contents distribution apparatus according to this embodiment. When the above processing has terminated, the routine proceeds to the contents acquiring handler 123.

Hence, by calculating the contents acquisition weight from the number of distributions for the same genre and the number of distributions for the same producer, it is possible to predict the contents expected to be in demand in the future. In other words, the contents predicting handler 122 can predict the contents expected to be in demand in the future based on the access trends and meta-information.

When the present time T is $t1 \leq T \leq t2$, the contents acquiring handler 123 acquires the contents for which the value of the state flag 414 in the database 410 of FIG. 4 is "acquire" from the server which manages contents, stores the contents in the disk apparatus 103, and updates the value of the state flag to "acquired". Here, t1, t2 are suitable parameters for management information for the contents distribution apparatus according to this embodiment. When the above processing has terminated, the routine proceeds to the contents deleting handler 126.

Hence, by calculating acquisition weights for contents using the access situation information, and acquiring contents that are not yet acquired in a separately defined time (i.e., a time zone when there is sufficient network bandwidth), the contents can be acquired prior to a distribution request from the client, by using, for example, a time zone when there is not much access from the clients and the network has sufficient bandwidth.

In the contents deleting handler 126, the following processing is performed. The values of the contents entry 411, genre entry 412 and producer entry 413 are read for the contents registered in the database 410 of FIG. 4, and the corresponding values of the number of distributions Nc for contents, number of distributions Ng for genres and number of distributions Np for producers are read from the number of distribution entries 421, 431, 441 of the databases 420, 430, 440.

The value T1 of the last distribution time entry 415 of the contents is read from the database 410. A deletion weight represented by $c*Nc+d*Ng+e*Np-f*T1$ is calculated for each contents, and a list wherein each entry comprises a contents and a deletion weight is prepared. Here, c, d, e and f are suitable parameters for management information of the contents distribution apparatus according to this embodiment. This list of deletion weights is sorted by the deletion weight as a key. For nd contents starting from the smallest deletion weight in the sorted list, the acquisition state flag entry 414 of the contents database 410 is examined, and if the value is "acquired", it is updated to "not acquired", and the contents are deleted from the disk apparatus 103 of FIG. 1.

Here, nd is a suitable parameter for management information for the contents distribution apparatus according to this embodiment.

When the above processing has terminated, the routine returns to the waiting process 301 which is the initial state.

Thus, the possibility that the contents expected to be in demand in the future will be deleted is reduced by using the past number of accesses to contents and the number of accesses to contents in the same genre or by the same producer as determining indicator in addition to the last distribution time when contents are deleted.

The following advantages are obtained by this embodiment.

By performing the determination 205 of whether the client has acquired the contents distribution permission, control can be performed to distribute contents only when this is specified separately by the server even for contents already stored in the disk apparatus 103. The decryption key corresponding to the contents-client pair may be distributed to the client by the decryption key acquiring handler 125. This technique is particularly useful when, for example, control is performed to distribute fee-based contents only to a client who has paid the contents fee.

Databases 420, 430, 440 are prepared comprising distribution numbers for each contents, genre and producer which are contents meta-information, and the values of the number of distributions entry 421 for contents, number of distributions entry 431 for genres and number of distributions entry 441 for producers are read for each contents. The value of the last distribution time entry 415 in the database 410 is also read. By calculating the acquisition weights and deletion weights from these values, contents expected to be in demand in the future can be predicted, and contents can be acquired or deleted.

By predicting contents expected to be in demand in the future, contents can be acquired prior to a distribution request from the client, by using a time zone when there is not much access from clients and there is sufficient network bandwidth.

Here, the meta-information of the contents was only the contents, genre and producer, but identical processing may be performed also for other information and used as acquisition weight or deletion weight parameters.

The featured points of the above embodiment may be summarized in the following items (a)–(f).

(a) The contents distribution apparatus comprises an apparatus which collects contents access situation information from a client, an apparatus which analyzes contents access trends based on the collected access situation information, an apparatus which predicts contents expected to be in demand in the future based on the analyzed access trends and transmits the access trends or access situation information to a server which transmits the contents to an apparatus in the aforesaid distribution apparatus which receives the contents, and an apparatus which receives the contents expected to be in demand in the future or a list of these contents from the server.

(b) The contents distribution apparatus comprises a database which records information for distinguishing a client and permission information regarding distribution of contents to the client, a database access apparatus, an authentication apparatus which authenticates the client and acquires the client distinguishing information, an apparatus which receives permission information regarding distribution of contents to the client from a server which manages distribution permission information, an apparatus which requests acquisition of permission to distribute the contents from the server to the client, and an apparatus which distributes the contents to the client.

Here, the client distinguishing information is acquired by the client authentication apparatus when the contents distribution request is received from the client, and the contents distribution permission information is checked against the client distinguishing information by the database access apparatus.

(c) In the contents distribution apparatus, the contents are encrypted, and an entry which registers the decryption key of the contents exists in the database. A server manages the decryption key, and the contents distribution apparatus further comprises an apparatus which requests the decryption key from the server, an apparatus which receives the decryption key from the server, and an apparatus which distributes the decryption key to the client.

Here, when distribution of the contents to the client is permitted and the decryption key is registered in the database, the decryption key is distributed to the client by the decryption key distributing apparatus.

(d) When distribution of the contents to the client is permitted and the decryption key is not registered in the database, the decryption key is requested to the server by the decryption key requesting apparatus, received from the server by the decryption key receiving apparatus, registered in the database by the database access apparatus, and distributed to the client by the decryption key distributing apparatus.

(e) When distribution of the contents to the client is not permitted, the distribution permission receiving apparatus receives the distribution permission, and the database access apparatus writes distribution permission information onto distribution permission information entry for the contents to the client in the database, the decryption key is requested to the server by the decryption key requesting apparatus, received by the decryption key receiving apparatus from the server, registered in the database by the database access apparatus, and distributed to the client by the decryption key distributing apparatus.

(f) An apparatus is provided wherein the contents deleting handler 126 determines a deletion timing of acquired contents using the contents access situation information from the client.

Figure 5:
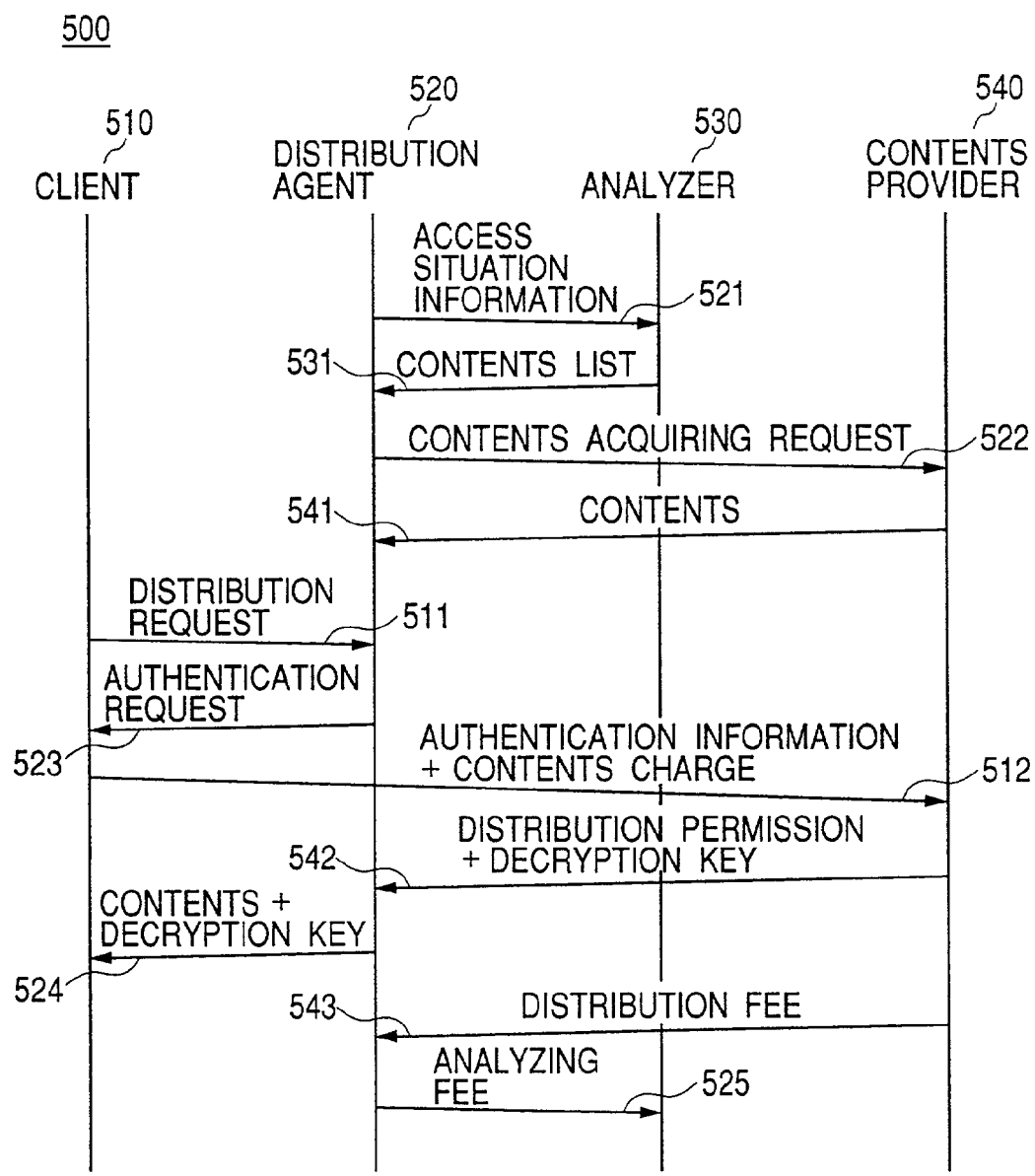
FIG. 5 is a diagram showing a time chart in a second embodiment of a contents distribution method according to this invention.

FIG. 5 is a time chart of a second embodiment of the contents distribution apparatus according to this invention. In FIG. 5, 500 is a time chart of the second embodiment of the contents distribution apparatus according to this invention, 510 is a client, 511 is a contents distribution request from the client to a distribution agent, 512 is authentication information and a contents fee from the client to a contents provider, 520 is a distribution agent, 521 is access situation information from the distribution agent to an analyzer, 522 is a contents acquisition request from the distribution agent to the contents provider, 523 is an authentication request from the distribution agent to the client, 524 are contents and a decryption key from the distribution agent to the client, 525 is an analysis fee from the distribution agent to the analyzer, 530 is the analyzer, 531 is a contents list from the analyzer to the distribution agent, 540 is the contents provider, 541 are contents from the contents provider to the distribution agent, 542 is a distribution permission and decryption key from the contents provider to the distribution agent, and 543 is a distribution agent fee from the contents provider to the distribution agent.

According to this embodiment, after the authentication information and the contents fee are transferred from the client 510 to the contents provider 540 as in 512, the contents provider 540 checks the authentication information of the client 510. After the contents fee has been checked, the contents provider 540 transfers the contents distribution permission and contents decryption key for the client 510 to the distribution agent 520 as in 542, and after the distribution agent 520 has received these information, the contents and its decryption key are distributed to the client 510 as in 524.

The distribution agent 520 collects access situation information related to contents access from the client 510 such as genre, producer, performers and access time, and transmits the access situation information to the analyzer 530 as in 521.

The analyzer 530 predicts contents expected to be in demand in the future from the client 510 based on the received access situation information, generates a list of these contents, and transmits the list to the distribution agent 520 as in 531.

The distribution agent 520 transmits a contents acquisition request as in 522 to the contents provider 540 based on the received contents list.

The contents provider 540 which received the contents acquisition request transmits the contents to the distribution agent 520 as in 541. In the distribution agent 520, the received contents are cached. Here, the contents are encrypted by a common key method, the encryption key used at this time being managed by the contents provider 540.

When the distribution agent 520 receives a distribution request for cached contents from the client 510 as in 511, the distribution agent 520 requests the client 510 to be authenticated by the contents provider 540, as in 523.

The distribution agent 520 may also request the client 510 to transmit accounting information or the like to the contents provider.

When the authentication request and accounting request are received, the client 510 transmits the authentication information and contents fee to the contents provider 540, as in 512. Here, the authentication information comprises the public key in the common key method of the client 510, or information necessary to acquire this public key. If the contents fee also includes information required for accounting such as a credit card number or bank account number, i.e., accounting information (information required to collect fees by various means such as bank transfer, account withdrawals, credit card transactions or Web Money), it is not necessarily paid in cash.

When the contents provider 540 checks the received authentication information and contents fee, the contents provider transmits a distribution permission and contents decryption key for the client 510 to the contents distribution agent 520, as in 542. Here, the contents decryption key is generated by encrypting the key which encrypted the contents by using a public key acquired based on the authentication information of the client 510.

When the distribution permission and decryption key are received, the distribution agent 520 distributes the contents requested by the client 510 and its decryption key to the client 510, as in 524.

Thus, the distribution agent 520 does not directly distribute the cached contents even if the distribution agent receives the distribution request 511. Instead, the contents provider 540 performs a check as in 512, and the contents are transmitted to the client 510 only when the distribution agent 520 receives distribution permission as in 542, the cached fee-based contents can be distributed only to the suitable clients.

Subsequently, the contents provider collects the contents fee from the client based on the client accounting information, and the contents provider 540 transfers a contents distribution agent fee, which is the fee for distributing the contents to the client 510, to the distribution agent 520 as in 543.

Further, the contents distribution agent 520 transfers an access situation analysis fee as in 525, which is a fee for predicting the contents expected to be in demand in the future, to the analyzer 530.

The following advantages are obtained from this embodiment.

By distributing the cached contents in 541 only when a distribution permission is received in 542, the fee-based contents of the contents provider 540 are cached by the distribution agent 520, and transmitted only to the client 510 who has paid the contents fee.

In this embodiment, the contents are encrypted by the common key method, and the encryption key is also encrypted individually for each client by the public key method, but the embodiment is not limited to this system and may be applied in the same way to any encryption method.

In this embodiment, the contents are encrypted, but if the contents are not encrypted, transmission and reception of the decryption key is not necessary and the embodiment can still be applied in the same way.

In this embodiment, the distribution permission and decryption key are transmitted to the distribution agent 520, as in 542, after the contents provider 540 has checked the contents fee transmitted by the client 510, as in 512. However, instead of transmitting the contents fee directly to the contents provider as in 512, the distribution agent may also collect the contents fee instead.

The featured points of this embodiment may be summarized by the steps described in (1)–(6) below.

(1) The contents distribution agent transmits a contents acquisition request and the contents provider receives the acquisition request.

(2) After receiving the acquisition request, the contents provider transmits encrypted contents to the contents distribution agent, and the contents distribution agent receives the contents.

(3) The client transmits a contents distribution request to the contents distribution agent, and after receiving the contents distribution request, the contents distribution agent transmits a client authentication request and accounting request to the client.

(4) After receiving the client authentication request and accounting request, the client transmits client authentication information and accounting information to the contents distribution provider. After receiving the client authentication information and accounting information, the contents distribution provider checks the authentication information and accounting information, and transmits the decryption key to the client.

(5) Subsequently, the contents are transmitted to the client.

(6) The contents provider collects the contents fee from the contents distribution agent based on the accounting information.

FIG. 6 is a time chart according to a third embodiment of the contents distribution method according to this invention. In FIG. 6, 600 is the time chart of the third embodiment of the contents distribution method according to this invention, 611 is an authentication information and a contents fee from the client to the distribution agent, 621 is a contents acquisition request and site license fee from the distribution agent to the contents provider, and 641 is the contents and decryption key from the contents provider to the distribution agent.

Here, "site license" means that the distribution agent obtains the contents and its decryption key by paying a certain fee (site license fee) to the contents provider. This site license fee is determined by the number of clients served by the distribution agent and so forth.

The embodiment of FIG. 6 will be further described with reference to the differences from the second embodiment of this invention already described in FIG. 5.

In the second embodiment, the distribution agent 520 has requested a contents acquisition as in 522, and received the contents as in 541, but in this embodiment, the distribution agent 520 transmits a contents acquisition request and contents site license fee to the contents provider 540 as in 621, and after the contents provider 540 has checked the site license fee, then the distribution agent 520 receives the contents and its decryption key as in 641.

In this way, a contents site license can be assigned by the contents provider 540 to the distribution agent 520. Here, the site license fee may not necessarily be cash if the fee includes information required for accounting such as a credit card number or bank account number and so forth.

In the second embodiment, when the client 510 has received the authentication request as in 523, the client 510 transmitted the authentication information and contents fee to the contents provider 540 as in 512, but in this embodiment, the client 510 transmits the authentication information and contents fee to the distribution agent 520, as in 611. When the distribution agent 520 has checked the received authentication information and contents fee, the contents and its decryption key are distributed to the client 510, as in 524.

The following advantages are obtained by this embodiment.

In the steps 621, 641, a site license for the fee-based contents can be received from the contents provider, therefore the distribution agent 520 can determine the fee for the contents and provide the contents to the client 510.

FIG. 7 is a block diagram of a fourth embodiment of the contents distribution method according to this invention. In FIG. 7, 700 is a block diagram of the fourth embodiment of the contents distribution method according to this invention, 701 is a contents provider 1, 702 is a contents provider 2, 703 is a contents provider 3, 711 is a list of contents belonging to the contents provider 1 from the contents provider 1 to the analyzer, 712 is a list of contents belonging to the contents provider 2 from the contents provider 2 to the analyzer, 713 is a list of contents belonging to the contents provider 3 from the contents provider 3 to the analyzer, 721 is an access situation information of the client from the distribution agent to the analyzer, 722 is a list comprising information relating to contents providers having contents which match the access trends from the analyzer to the distribution agent, and 731 is an access from the client to the distribution agent.

In this embodiment, the analyzer 530 analyzes the access trends of the client 510 based on the collected access situation information of the distribution agent 520, and transmits information relating to contents providers having contents which match these access trends, to the distribution agent 520, as in 722.

When the access 731 occurs from the client 510 to the distribution agent 520, the distribution agent 520 collects the access situation information, comprising information such as the genre and producer and so forth of the contents requested by the client 510. The distribution agent 520 transmits the collected access situation information to the analyzer 530, as in 721.

The contents providers 1 to 3 of 701 to 703 transmits lists of their respective contents to the analyzer 530, as in 711 to 713. Here, the contents list comprises meta-information such as the genre and producer and so forth.

The analyzer 530 analyzes the contents access trends of the client 510 based on the access situation information received in 721, and searches whether or not there are contents matching these access trends related to the respective lists received in 711 to 713. When such contents exist, information relating to the contents provider which transmitted the list of these contents, for example the contents provider 1, such as contact information or contents usage conditions and so forth, is transmitted to the distribution agent 520, as in 722.

The distribution agent 520 acquires these contents from the contents provider having contents matching the access trends, for example the contents provider 1, based on the information received in 722.

The following advantages are obtained by this embodiment.

The analyzer 530 analyzes the access situation information acquired in 721 and further analyzes the access trends, and by searching for contents matching the access trends from the lists of contents belonging to the contents providers acquired in 711 to 713, the distribution agent 520 can be made aware that a contents provider has contents matching the access trends, without any special information acquisition procedure, even in the case of a contents provider having no previous experience of transactions with the distribution agent 520.

In this embodiment, the analyzer 530 searches which contents provider has contents matching the access trends, and the distribution agent 520 acquires the contents based on information relating to contents providers obtained by this search result.

Further, in this embodiment, the analyzer 530 can act as an agent up to acquisition of the contents matching the access trends, and the acquired contents are then transmitted to the distribution agent 520.

The following variation may also be proposed in implementing this invention.

(i) In a first contents distribution apparatus and second contents distribution apparatus comprising the contents distribution apparatus of the first embodiment respectively, the first contents distribution apparatus may also transmit first contents acquired from a neighboring server to the second contents distribution apparatus, and the second contents distribution apparatus may also transmit second contents acquired from a neighboring server to the first contents distribution apparatus.

According to this invention, the access situation information concerning client access to the contents can be collected, the contents access trends can be analyzed based on this information, and contents expected to be in demand in the future can be predicted and acquired based on this analysis result.

By acquiring the contents when there is not much access from clients in a time zone when there is sufficient network bandwidth, network bandwidth can be efficiently used.

This technique effectively estimates a future contents access situation from the past contents access situation, therefore contents having a high probability of future access can be acquired by the contents distribution apparatus, and disk capacity can be effectively utilized.

In determining from the access situation information the timing for deleting the acquired contents from the disk apparatus, as the future access situation can be estimated from the past access situation, the number of occasions on which the same contents are repeatedly deleted, and acquired or distributed is reduced, network bandwidth is efficiently used, and disk space is efficiently used.

According to this invention, by distributing the contents acquired by the contents distribution apparatus to the client after distribution permission is received, control can be performed so that fee-based contents are cached and distributed only to clients who have paid the contents fee.

Further, according to this invention, the distribution agent can be made aware that a contents provider has contents matching client access trends without performing any special information acquisition procedure, and even in the case of a contents provider having no previous transaction experience.

Furthermore, the present invention provides a method of introducing a contents provider to an ISP (Internet Service Provider), a method of providing or distributing contents to a client and a method for distributing contents between a contents provider, a contents distribution agent and a client, as defined by the following points:

1. A method for introducing a contents provider to an ISP (Internet Service Provider), including a step of collecting contents access situation information from the client in the ISP; a step of analyzing access trends to the contents based on the contents access situation information; a step of predicting contents expected to be in demand in the future based on the access trends; and a step of searching a contents provider who has contents in a certain category predicted to be in demand in the future from a list and of introducing the provider to the ISP.

2. A method for distributing contents to a client, including a step of collecting contents access situation information from the client; a step of analyzing access trends to the contents based on the contents access situation information; a step of predicting contents expected to be in demand in the future based on the access trends and of transmitting the access trends to a server which transmits a list of the contents; a step of receiving the list of the contents from the server; and a step of acquiring the contents based on the received list of the contents.

3. A method for distributing contents between a contents provider, a contents distribution agent and a client, including a step of caching by the contents distribution agent contents of the contents provider; a step of transmitting by the client a contents distribution request to the contents distribution agent; a step of transmitting an authentication request and an accounting request to the client after the contents distribution agent receives the contents distribution request; a step of transmitting authentication information and accounting information to the contents provider after the client receives the authentication request and the accounting request; a step of checking the authentication information and accounting information by the contents provider after receiving the authentication information and the accounting information; a step of transmitting the distribution permission for the client to the contents distribution agent by the contents provider after checking the authentication information and the accounting information; a step of distributing the cached contents to the client by the contents distribution agent after receiving the distribution permission; a step of collecting a contents fee from the client based on the accounting information for the client by the contents provider; and a step of transferring a contents distribution fee to the contents distribution agent by the contents provider.

4. In the method of point 3, the method further includes a step of collecting the contents access situation information from the client by the contents distribution agent; a step of transmitting the contents access situation information to an analyzer; a step of analyzing the access trends based on the contents access situation information, a step of predicting contents expected to be in demand in the future and a step of transmitting a list of the contents to the contents distribution agent, by the analyzer; and a step of transferring an access trends analysis fee to the analyzer by the contents distribution agent, wherein the step of caching the contents of the contents provider, caches contents based on the list of the contents by the contents distribution agent.

5. In the method of point 3, the method further includes a step of collecting the contents access situation information from the client by the contents distribution agent; a step of transmitting the contents access situation information to an analyzer; and a step of analyzing the access trends based on the contents access situation information, predicting contents expected to be in demand in the future and transmitting the contents to the contents distribution agent, by the analyzer, wherein the step of caching the contents of the contents provider by the contents distribution agent, receives the transmitted contents.

6. In the method of points 3–5, the step of transmitting by the client the authentication information and the accounting information to the contents provider, further includes a step of transmitting the authentication information and the accounting information to the contents distribution agent from the client; and a step of transmitting the authentication information and the accounting information to the contents provider from the contents distribution agent.

7. In the method of points 3–6, the contents are encrypted, and the method further includes a step of transmitting a contents decryption key to the contents distribution agent by the contents provider after checking the authentication information and the accounting information; and a step of distributing the decryption key to the client by the contents distribution agent after receiving the distribution permission.

8. The present invention also provides a method of distributing contents between a contents provider, a contents distribution agent and a client, which includes a step of transmitting a contents acquisition request and accounting information for the cost of the contents to the contents provider by the contents distribution agent; a step of checking the accounting information by the contents provider after receiving the acquisition request and accounting information; a step of transmitting the contents to the contents distribution agent by the contents provider after the step of checking the accounting information; a step of receiving the contents by the contents distribution agent; a step of collecting the contents fee from the contents distribution agent based on the accounting information by the contents provider; a step of transmitting a contents distribution request to the contents distribution agent by the client; a step of transmitting a client authentication request and a client accounting request to the client by the contents distribution agent after receiving the contents distribution request; a step of transmitting the client authentication information and the client accounting information to the contents distribution agent by the client after receiving the client authentication request and the client accounting request; a step of checking the client authentication information and client accounting information by the contents distribution agent after receiving the client authentication information and the client accounting information; a step of distributing the contents to the client by the contents distribution agent after the step of checking; and a step of collecting the contents fee from the client based on the client accounting information by the contents distribution agent.

9. In the method of point 8, the contents are encrypted, and the method further includes a step of transmitting a contents decryption key to the contents distribution agent by the contents provider after the step of checking the accounting information; and a step of distributing the decryption key to the client by the contents distribution agent after checking the client authentication information and the client accounting information.

10. The present invention still provides a method of providing contents to a client, which includes a step of transmitting contents access situation information to an analyzing agent which analyzes contents access trends and predicts contents expected to be in demand in the future; a step of receiving a list of contents which are expected to be in demand in the future from the analyzing agent; a step of transmitting a contents acquisition request to a contents provider based on the list of the contents; a step of acquiring the contents from the contents provider; and a step of distributing the contents to the client based on the distribution request from the client.

11. In the method of point 10, the step of distributing the contents to the client based on the distribution request from the client, further includes a step of requesting authentication from the client; a step of receiving distribution permission transmitted from the contents provider after the contents provider has checked the authentication information and the accounting information transmitted from the client; and a step of distributing the contents to the client after receiving the distribution permission.

The foregoing invention has been described in terms of the preferred embodiments and the above-mentioned points. However, those skilled in the art, will recognize that many variations of such embodiments exist. Such variations are intended to be within the scope of the present invention and the appended claims.

What is claimed is:

1. A cache server set between a content server and a plurality of clients for distributing contents to the clients, based on requests sent from the clients, said content server is requested to provide contents by said clients via said cache server and in response transfers said requested contents to the clients, said cache server comprising:

an apparatus for collecting contents access situation information from the clients; an apparatus for analyzing contents access trends based on the contents access situation information of accesses to the contents as conducted by the clients;

an apparatus for transmitting the contents access trends to an apparatus which predicts contents expected to be in demand for said clients in the future based on the contents access trends and causing the contents expected to be in demand in the future to be transmitted;

an apparatus for receiving the contents expected to be in demand in the future from the content server in advance before access requests are received from the clients;

a cache apparatus for storing the received contents; and an apparatus for transmitting requested contents from the contents expected to be in demand in the future to the clients in accordance with the requests when received from the clients, wherein the requested contents from the contents expected to be in demand in the future are distributed to a client only when distribution of the contents to the client is permitted, and when distribution of the contents to the client is not permitted, requesting to acquire distribution permission from a server which manages content distribution permission information, wherein the requested contents distributed to the client having permission is encrypted and the encrypted requested contents is distributed along with a decryption key so that the client having permission can decrypt the encrypted requested contents using the decryption key upon receipt thereof.

2. An apparatus for distributing contents to a client as defined in claim 1, further comprising:

an apparatus for transmitting the contents access situation information to the server which transmits a list of the contents predicted;

an apparatus for receiving the list of the contents from the server; and an apparatus for acquiring the contents based on the list of the contents.

3. A cache server apparatus set between a content server and a plurality of clients for distributing contents to the clients, based on requests sent from the clients, said content server is requested to provide contents by said clients via said cache server and transfers said requested contents to the clients, said cache server comprising:

an apparatus for collecting contents access situation information from the clients;

an apparatus for transmitting the contents access situation information to a server, which analyzes contents access trends based on the contents access situation information of accesses to the contents as conducted by the clients, predicting contents expected to be in demand in the future and causing the contents expected to be in demand in the future to be transmitted; and an apparatus for receiving the contents expected to be in demand in the future from the content server in advance before access requests are received from the clients, storing the received contents, and transmitting the requested contents from the contents expected to be in demand in the future I to the clients in accordance with the requests when received from the clients, wherein the requested contents from the contents expected to be in demand in the future are distributed to a client only when distribution of the contents to the client is permitted, and when distribution of the contents to the client is not permitted, requesting to acquire distribution permission from a server which manages content distribution permission information, wherein the requested contents distributed to the client having permission is encrypted and the encrypted requested contents is distributed along with a decryption key so that the client having permission can decrypt the encrypted requested contents using the decryption key upon receipt thereof.

4. A cache server set between a content server and a plurality of clients for distributing contents to the clients, based on requests sent from the clients, said content server is requested to provide contents by said clients via said cache server and transfers said requested contents to the clients, said cache server comprising:

an apparatus for collecting contents access situation information from the clients;

an apparatus for analyzing contents access trends based on the contents access situation information of accesses to the contents as conducted by the clients;

an apparatus for transmitting the contents access trends to an apparatus which predicts contents expected to be in demand for said clients in the future based on the contents access trends and causing the contents expected to be in demand in the future to be transmitted;

an apparatus for receiving the contents expected to be in demand in the future from the content server in advance before requests are received from the clients;

a cache apparatus for storing the received contents;

an apparatus for storing a database for recording information for distinguishing a client and recording permission information concerning distribution of contents to the client;

a database access apparatus;

an authentication apparatus for authenticating the client and acquiring the information for distinguishing the client;

an apparatus for receiving the permission information concerning distribution of contents to the client from a server which manages distribution permission information;

an apparatus for requesting acquisition of permission to distribute the contents from the server to the client; and an apparatus for transmitting requested contents from the contents expected to be in demand in the future to the clients in accordance with the requests when received from the clients, wherein the requested contents from the contents expected to be in demand in the future are distributed to a client only when distribution of the contents to the client is permitted, and wherein the requested contents distributed to the client having permission is encrypted and the encrypted requested contents is distributed along with a decryption key so that the client having permission can decrypt the encrypted requested contents using the decryption key upon receipt thereof, wherein the client distinguishing information is acquired by the authentication apparatus when a contents distribution request is received from the client, the distribution permission information of the contents is checked for the client distinguishing information by the database access apparatus, wherein the contents are distributed to the client when the distribution is permitted, wherein a request is made to acquire permission to distribute the contents from the server to the client by the apparatus for requesting acquisition of permission when the distribution is not permitted, and wherein the permission information concerning distribution of contents to the client is written by the database access apparatus onto the database for recording permission information, and the contents are distributed to the client when the apparatus for receiving the permission information receives permission to distribute the contents to the client from the server.

5. The apparatus as defined in claim 4, wherein the contents are encrypted and an entry which registers the decryption key of the contents exists in the database, and the server manages the decryption key, the apparatus further comprises:

an apparatus for requesting the decryption key from the server which manages the decryption key;

an apparatus for receiving the decryption key from the server; and an apparatus for distributing the encryption key to the client, wherein when distribution of the contents to the client is permitted and the decryption key is registered in the database, the decryption key is distributed to the client by the apparatus for distributing the decryption key, wherein when distribution of the contents to the client is permitted and the decryption key is not registered in the database, the decryption key is requested from the server by the apparatus for requesting the decryption key, received by the apparatus for receiving the decryption key, registered in the database by the database access apparatus, and distributed to the client by the apparatus for distributing the decryption key, wherein when distribution of the contents to the client is not permitted, the apparatus for receiving the permission information receives the distribution permission, and the database access apparatus writes the permission information onto the permission information concerning the distribution of the contents in the database, and wherein the decryption key is requested from the server by the apparatus for requesting the decryption key, received from the server by the apparatus for receiving the decryption key, registered in the database by the database access apparatus, and distributed to the client by the apparatus for distributing the decryption key.

6. contents distribution apparatus defined in claim 1, wherein both a first contents distribution apparatus and a second contents distribution apparatus are the contents distribution apparatus, wherein the first contents distribution apparatus transmits first contents acquired from a neighboring server to the second contents distribution apparatus, and wherein the second contents distribution apparatus transmits second contents acquired from a neighboring server to the first contents distribution apparatus.

7. The contents distribution apparatus as defined in claim 1, further comprising an apparatus for determining a deletion timing of the contents acquired using the contents access situation information.

8. The contents distribution as defined in claim 1, wherein this apparatus receives the contents from the server in a time zone when there is sufficient network bandwidth.

9. The contents distribution apparatus as defined in claim 3, comprising:

an apparatus for transmitting the contents access situation information to the server which transmits a list of the contents predicted;

an apparatus for receiving the list of the contents from the server; and an apparatus for acquiring the contents based on the list of the contents.

10. The contents distribution apparatus as defined in claim 3, wherein this apparatus receives the contents from the server in a time zone when there is sufficient network bandwidth.

11. An apparatus set between a server and a client for distributing contents to the client, comprising:

an apparatus for collecting contents access situation information from the client;

an apparatus for analyzing contents access trends based on the contents access situation information;

an apparatus for transmitting the contents access trends to a server which predicts contents expected to be in demand in the future based on the contents access trends and transmits the contents;

an apparatus for receiving the contents expected to be in demand in the future from the server in advance before an access request is received from the client;

an apparatus for storing the received contents; and an apparatus for transmitting requested contents from the contents expected to be in demand in the future to the client in accordance with a the request when received from the client, wherein the requested contents from the contents expected to be in demand the future are distributed to a client only when distribution of the contents to the client is permitted, and when distribution of the contents to the client is not permitted, requesting to acquire distribution permission from a server which manages content distribution permission information, wherein the requested contents distributed to the client having permission is encrypted and the encrypted requested contents is distributed along with a decryption key so that the client having permission can decrypt the encrypted requested contents using the decryption key upon receipt thereof, wherein this apparatus calculates an acquisition weight based on a value obtained by multiplying the number of distributions for genre name and the number of distribution for producer by parameters, and acquires the contents from the server in decreasing order of acquisition weight.

12. An apparatus set between a server and a client for distributing contents to the client, comprising:

an apparatus for collecting contents access situation information from the client;

an apparatus for analyzing content: access trends based on the contents access situation information;

an apparatus for transmitting the contents access trends to a server which predicts contents expected to be in demand in the future based on the contents access trends and transmits the contents;

an apparatus for receiving the contents expected to be in demand in the future from the server in advance before an access request is received from the client;

an apparatus for storing the received contents; and an apparatus for transmitting the requested contents from the contents expected to be in demand in the future to the client in accordance with a the request when received from the client, wherein the requested contents from the contents expected to be in demand in the future are distributed to a client only when distribution of the contents to the client is permitted, and when distribution of the contents to the client is not permitted, requesting to acquire distribution permission from a server which manages content distribution permission information, wherein the requested contents distributed to the client having permission is encrypted and the encrypted requested contents is distributed along with a decryption key so that the client having permission can decrypt the encrypted requested contents using the decryption key upon receipt thereof; and an apparatus for deleting contents, wherein this apparatus calculates a deletion weight based on the number of distributions for name, the number of distributions for genre name, the number of distributions for producer and the last distribution time, and deletes the stored contents in increasing order of the deletion weight.

13. An apparatus set between a server and a client for distributing contents to the client, comprising:

an apparatus for collecting contents access situation information from the client;

an apparatus for transmitting the contents access situation information to a server which analyzes contents access trends based on the contents access situation information, predicting contents expected to be in demand in the future and transmits the contents predicted; and an apparatus for receiving the contents expected to be in demand in the future from the server in advance before an access request is received from the client, storing the received contents, and transmitting requested contents from the contents expected to be in demand in the future to the client in accordance with the request when received from the client, wherein the requested contents from the contents expected to be in demand in the future are distributed to a client only when distribution of the contents to the client is permitted, and when distribution of the contents to the client is not permitted, requesting to acquire distribution permission from a server which manages content distribution permission information, wherein the requested contents distributed to the client having permission is encrypted and the encrypted requested contents is distributed along with a decryption key so that the client having permission can decrypt the encrypted requested contents using the decryption key upon receipt thereof, and wherein this apparatus calculates an acquisition weight based on a value obtained by multiplying the number of distributions for genre name and the number of distributions for producer by parameters, and acquires the contents from the server in decreasing order of the acquisition weight.

14. An apparatus set between a server and a client for distributing contents to the client, comprising:

an apparatus for collecting contents access situation information from the client;

an apparatus for transmitting the contents access situation information to a server which analyzes contents access trends based on the contents access situation information, predicting contents expected to be in demand in the future and transmits the contents predicted; and an apparatus for receiving the contents expected to be in demand in the future from the server in advance before an access request is received from the client, storing the received contents, and transmitting requested contents from the contents expected to be in demand in the future to the client in accordance with the request when received from the client, wherein the requested contents from the contents expected to be in demand in the future are distributed to a client only when distribution of the contents to the client is permitted, and when distribution of the contents to the client is not permitted, requesting to acquire distribution permission from a server which manages content distribution permission information, wherein the requested contents distributed to the client having permission is encrypted and the encrypted requested contents is distributed along with a decryption key so that the client having permission can decrypt the encrypted requested contents using the decryption key upon receipt thereof; and an apparatus for deleting contents, wherein this apparatus calculates a deletion weight based on the number of distributions for name, the number of distributions for genre name, the number of distributions for producer and the last distribution time, and deletes the stored contents in increasing order of the deletion weight.

15. An apparatus set between a server and a client for distributing contents to the client, comprising:

an apparatus for collecting contents access situation information from the client;

an apparatus for analyzing contents access trends based on the contents access situation information;

an apparatus for transmitting the contents access trends to a server which predicts contents expected to be in demand in the future based on the contents access trends and transmits the contents;

an apparatus for receiving the contents expected to be in demand in the future from the server in advance before a request is received from the client;

an apparatus for storing the received contents;

an apparatus for storing a database for recording information for distinguishing a client and recording permission information concerning distribution of contents to the client;

a database access apparatus;

an authentication apparatus for authenticating the client and acquiring the information for distinguishing the client;

an apparatus for receiving the permission information concerning distribution of contents to the client from a server which manages distribution permission information;

an apparatus for requesting acquisition of permission to distribute the contents from the server to the client; and an apparatus for transmitting requested contents from the contents expected to be in demand in the future to the client in accordance with the request when received from the client, wherein the requested contents from the contents expected to be in demand in the future is distributed to the client only when distribution of the contents to the client is permitted, wherein the requested contents distributed to the client having permission is encrypted and the encrypted requested contents is distributed along with a decryption key so that the client having permission can decrypt the encrypted requested contents using the decryption key upon receipt thereof, wherein the client distinguishing information is acquired by the authentication apparatus when contents distribution request is received from the client, wherein the distribution permission information of the contents is checked for the client distinguishing information by the database access apparatus, wherein the contents are distributed to the client when the distribution is permitted, a request is made to acquire permission to distribute the contents from the server to the client by the apparatus for requesting acquisition of permission when the distribution is not permitted, and wherein the permission information concerning distribution of contents to the client is written by the database access apparatus onto the database for recording permission information, and the contents are distributed to the client when the apparatus for receiving the permission information receives permission to distribute the contents to the client from the server, and wherein this apparatus calculates an acquisition weight based on a value obtained by multiplying the number of distributions for genre name and the number of distributions for producer by parameters, and acquires the contents from the server in decreasing order of the acquisition weight.

16. An apparatus set between a server and a client for distributing contents to the client, comprising:

an apparatus for collecting contents access situation information from the client;

an apparatus for analyzing contents access trends based on the contents access situation information;

an apparatus for transmitting the contents access trends to a server which predicts contents expected to be in demand in the future based on the contents access trends and transmits the contents;

an apparatus for receiving the contents expected to be in demand in the future from the server in advance before a request is received from the client;

an apparatus for storing the received contents;

an apparatus for storing a database for recording information for distinguishing a client and recording permission information concerning distribution of contents to the client;

a database access apparatus;

an authentication apparatus for authenticating the client and acquiring the information for distinguishing the client;

an apparatus for receiving the permission information concerning distribution of contents to the client from a server which manages distribution permission information;

an apparatus for requesting acquisition of permission to distribute the contents from the server to the client;

an apparatus for transmitting requested contents from the contents expected to be in demand in the future to the client in accordance with the request when received from the client, wherein the requested contents from the contents expected to be in demand in the future is distributed to the client only when distribution of the contents to the client is permitted, wherein the requested contents distributed to the client having permission is encrypted and the encrypted requested contents is distributed along with a decryption key so that the client having permission can decrypt the encrypted requested contents using the decryption key upon receipt thereof, wherein the client distinguishing information is acquired by the authentication apparatus when contents distribution request is received from the client, wherein the distribution permission information of the contents is checked for the client distinguishing information by the database access apparatus, wherein the contents are distributed to the client when the distribution is permitted, wherein a request is made to acquire permission to distribute the contents from the server to the client by the apparatus for requesting acquisition of permission when the distribution is not permitted, and wherein the permission information concerning distribution of contents to the client is written by the database access apparatus onto the database for recording permission information, and the contents are distributed to the client when the apparatus for receiving the permission information receives permission to distribute the contents to the client from the server; and an apparatus for deleting contents, wherein this apparatus calculates a deletion weight based on the number of distributions for name, the number of distributions for genre name, the number of distributions for producer and the last distribution time, and deletes the stored contents in increasing order of the deletion weight.

* * * * *